Figure 1:
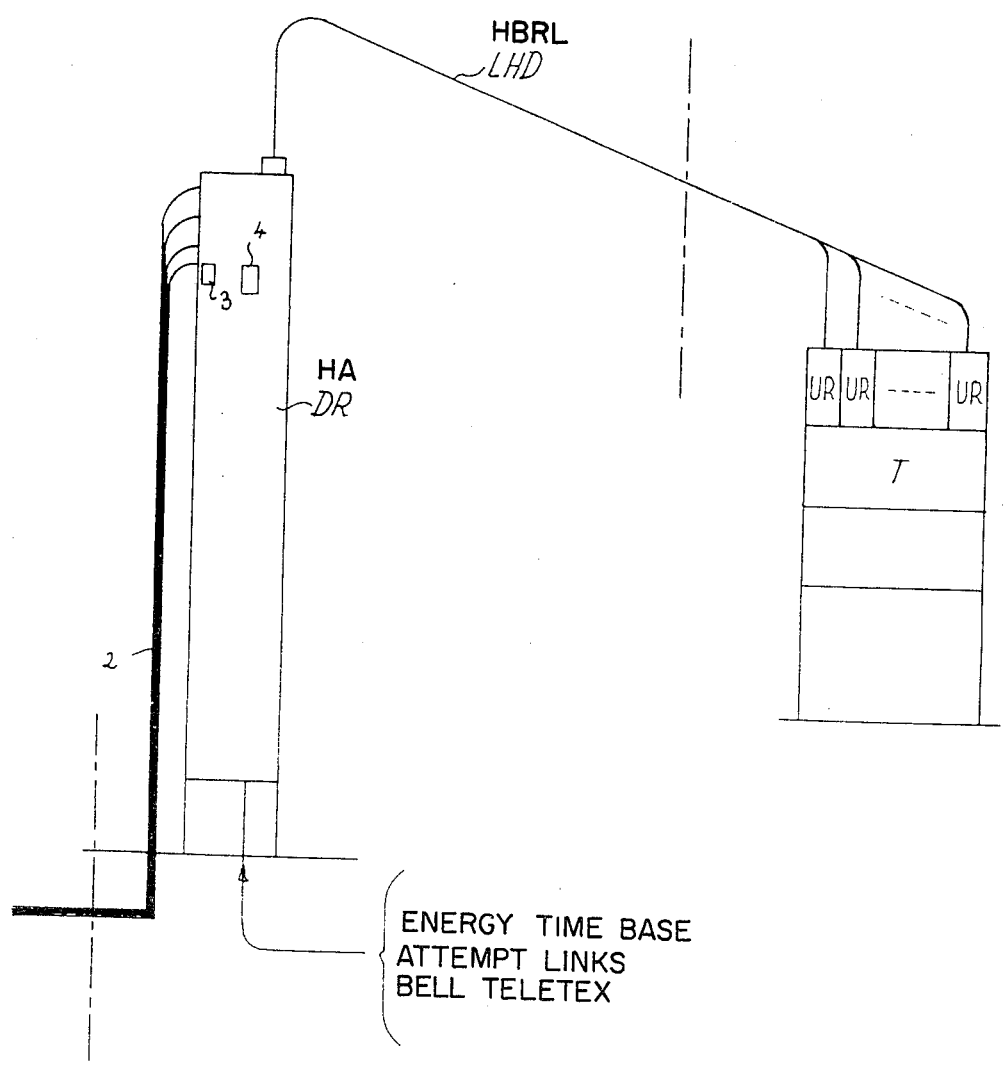

United States Patent [19]

Cochennec

[11] 4,417,333

[45] Nov. 22, 1983

[54] SYSTEM TO INTERCONNECT SUBSCRIBER LINES TO A TELEPHONE AUTOMATIC TIME DIVISION SWITCH

[76] Inventor: Jean-Yves Cochennec, Rue de Kernevez, F-22560 Trebeurden, France

[21] Appl. No.: 320,191

[22] Filed: Nov. 12, 1981

[30] Foreign Application Priority Data

Nov. 28, 1980 [FR] France ............................... 80 26030

[51] Int. Cl.³ .......................................... H04Q 11/04
[52] U.S. Cl. ...................................... 370/66; 370/112
[58] Field of Search ............. 179/16 R, 18 R, 18 AG, 179/18 H; 370/58, 66, 77, 112

[56] References Cited

U.S. PATENT DOCUMENTS

| | | | |
|---|---|---|---|
| 4,025,725 | 5/1977 | Euler | 370/66 |
| 4,152,543 | 5/1979 | Prudhov et al. | 370/112 |

FOREIGN PATENT DOCUMENTS

| | | |
|---|---|---|
| 2156965 | 5/1973 | France . |
| 2302654 | 9/1976 | France . |
| 2429534 | 1/1980 | France . |
| 2443781 | 7/1980 | France . |

OTHER PUBLICATIONS

International Symposium on Subscriber Loops and Services; Munich, Sep. 15–19, 1980; Proceedings, pp. 94–97.

"Communication & Transmission"; vol. 1, No. 1, Sep. 1979, Paris, pp. 87–102.

*Primary Examiner*—Benedict V. Safourek
*Attorney, Agent, or Firm*—Laff, Whitesel, Conte & Saret

[57] ABSTRACT

A system to interconnect subscriber lines to a telephone automatic time division switch.

The system comprises, on the subscriber lines side, interconnection apparatus (HAi) and, on the automatic switching side, interconnection units (HUi), which are connected by high bit rate links (HBRLi). Each HAi is associated with the 112 lines of a cable and has, for each subscriber line, an individual subscriber apparatus with an A/D and D/A converter whose digital output is connected to an outgoing multiplex and the digital input to an incoming multiplex, forming a PCM multiplex.

An HAi comprises a multiplexor (30i), a multiplexor (31i) to which are connected seven PCMs, on one side, and a first link of 34 Mbit/s on the other, and a multiplexor (32i) to which is connected, on one side, the first link of multiplexor (30i) and a second link at 34 Mbit/s from the neighboring interconnection apparatus (HA-(i−1)), and, on the other side, a third 34 Mbit/s link which is connected by transmission and reception system (33i), to a link (HBRLi). A coupler (34i) is set up between the multiplexor link (31i) and a second link to the multiplexor (32(i+1)). A unit (HAi) presents an analog structure through link (HBRLi).

2 Claims, 7 Drawing Figures

SYSTEM TO INTERCONNECT SUBSCRIBER LINES TO A TELEPHONE AUTOMATIC TIME DIVISION SWITCH

The present invention relates to an interconnection system for subscriber telephone lines to an automatic time division switching system and, more particularly to means for increasing the security of such a system.

In the application for a French patent No. 78 35483 applied for on Dec. 8, 1978 by the present applicant, a system of this type is described, in which, to each single subscriber line, is associated individual subscriber apparatus which is comprised of means for providing the conventional line interfacing tasks and, furthermore, a conventional four-two wire differential coupler, the four wire output of the coupler being connected to an analog/digital converter whose digital output is connected to an outgoing multiplex and digital input to an incoming multiplex, each individual subscriber equipment respectively having in the said outgoing and incoming multiplexes an allocated outgoing and returning link. In the system described in the above-mentioned patent application, the outgoing and incoming multiplexes are respectively multipled on corresponding inputs and outputs from a number of basic time division switches each of which is connected by an outgoing-incoming multiplex to a time division switch stage of an automatic time division switch. Each basic time division switch switches, in a permanent programmable manner, an outgoing channel of an entering multiplex with an outgoing channel of the link multiplex and, conversely, a return channel of an outgoing multiplex with a return channel of the link multiplex.

In practice, in this known system, the link multiplexes that exist between a number of basic time division switches and the automatic time division switch are themselves transmitted in a multiplexed manner on a high bit rate link, supported, for example, by a coaxial cable or an optical fiber. However, measures must be taken such that the failure of such a link does not lead to an interruption of service to the subscribers it normally serves. To guarantee the security of such a system, a duplication of the high data rate link can be provided, in such a way that in case of failure of the high bit rate link in service, the traffic may be flipped over to another high bit rate link. However, inconveniences such as duplication are obvious. To begin with, the number of high bit rate links to be installed is multiplied by two. Then, in the automatic time division switch hook-up unit we encounter substantial connection difficulties for the high bit rate link supports and difficulties of rate distribution. In fact, it is known that coupling of optical fibers are difficult and it is thus pointless to duplicate them. Finally, the standby link, on which the traffic is flipped, must be continuously tested to be sure that it operates properly at changeover.

We recall that a high bit rate link called HBR, is, according to the CCITT recommendations a 34 Mbit/s link. The 34 Mbit/s multiplex is obtained by multiplexing sixteen 32 channel primary PCM multiplexes, that is at 2 Mbit/s. The multiplexing of the sixteen PCMs is carried out in known multiplexors which yield a 32 Mbit/s multiplex which is applied to transmission and reception apparatus, which allows after transmission on a normalized junction a rate of 34 Mbits/s. The transmission and reception apparatus comprises also, HBR link supervisory operation circuits. One will find the description of a multiplexor and transmission-reception apparatus in the French Journal "Ericsson Review", No. 2, 1978 in the article titled "Equipement Multiplex Numerique Pour Systemes de Lignes a 8 et 34 Mbits/s" and in the commercial documents of the German company Siemens Aktiengesellschaft under the title "Digital Multiplex Unit DSMX2/8 for the Conversion of 4×2048 kbits/s to 8448 kbits/s" and "Digital Multiplex Unit DSMX8/34 for the Conversion of 4×8448 kbit/s to 34368 kbit/s."

One object of the invention consists in providing an interconnection system for subscriber telephone lines to an automatic telephone time division switching system in which, to guarantee the security of the system, we avoid duplication of the high data rate lines and as such avoid the above-mentioned inconveniences.

In accordance with a characteristic of the invention, such a system is provided comprising, on the subscriber lines side, interconnection apparatus and, on the side of the automatic switch, interconnection units which are connected two by two to high bit rate lines, each interconnection apparatus being associated with the 112 lines of a cable and having, for each single subscriber line, an individual subscriber equipment which comprises means to accomplish the conventional line interfacing functions and also a conventional 2-wire/4-wire differential coupler, the 4-wire output of the coupler being connected to an analog-to-digital and digital-to-analog converter whose digital output is connected to an outgoing multiplex and whose digital input is connected to an entering multiplex, forming together a PCM multiplex, each individual subscriber equipment respectively having in the said PCM multiplex an allocated outgoing channel and an allocated return channel, a multiplex PCM thus serving sixteen individual subscriber equipments, in which seven PCM are provided to serve the 112 lines of a cable, comprising a first multiplexor and a second multiplexor to which are connected the seven PCM, on one side, and a first 34 Mbits/s link on the other, a third multiplexor to which is connected, on one side, the first 34 Mbit/s link from the first multiplexor and a second 34 Mbit/s link provided from a neighboring interconnection equipment of immediate lower order, and, on the other side, a third 34 Mbit/s link is connected to one terminal of a transmission reception apparatus whose other terminal is connected to the 32 Mbit/s link of the second multiplexor and the other terminal by a second 34 Mbit/s link to the third multiplexor of the neighboring interconnection equipment of immediate higher order.

In accordance with another characteristic, the interconnection unit comprises for each high bit rate transmission-reception apparatus, a multiplexor connected, on one side to the transmission-reception apparatus and, on the other side, to two equal groups of sub-multiple rate multiplexes, a second multiplexor connected, on one side, on one hand to the first group of sub-multiple rate multiplexes connected to the first multiplexor of the hook-up unit and on the other hand to the second group of sub-multiple rate multiplexes connected to the first multiplexor of the hook-up unit of immediate higher order, and, on the other side to a buffer memory, itself connected to the automatic time division switch.

Figure 2:
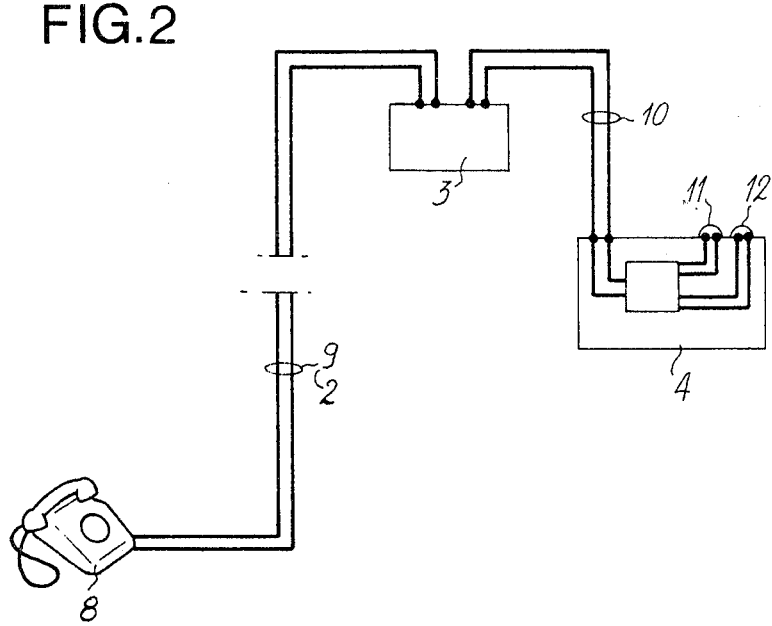
Figure 5:
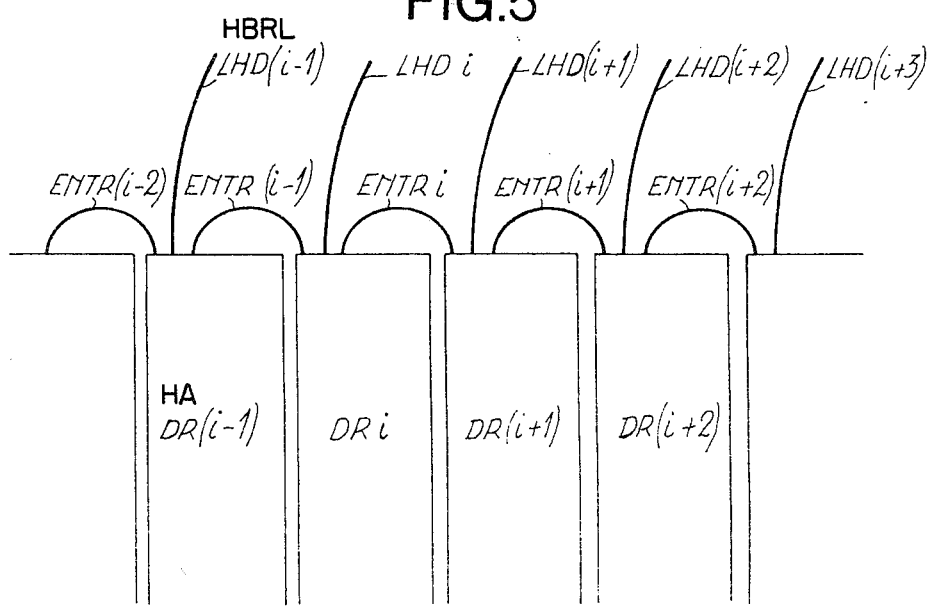
Figure 3:
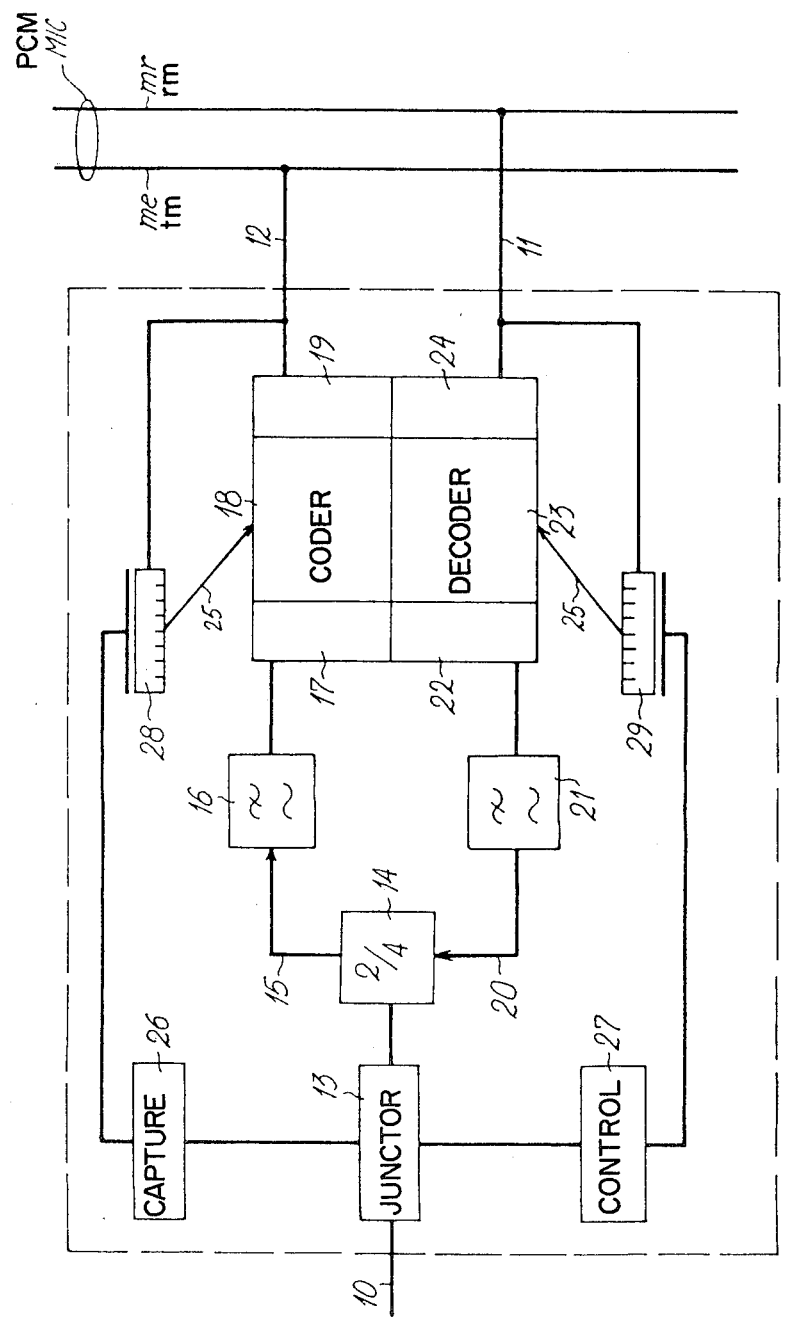
Figure 4:
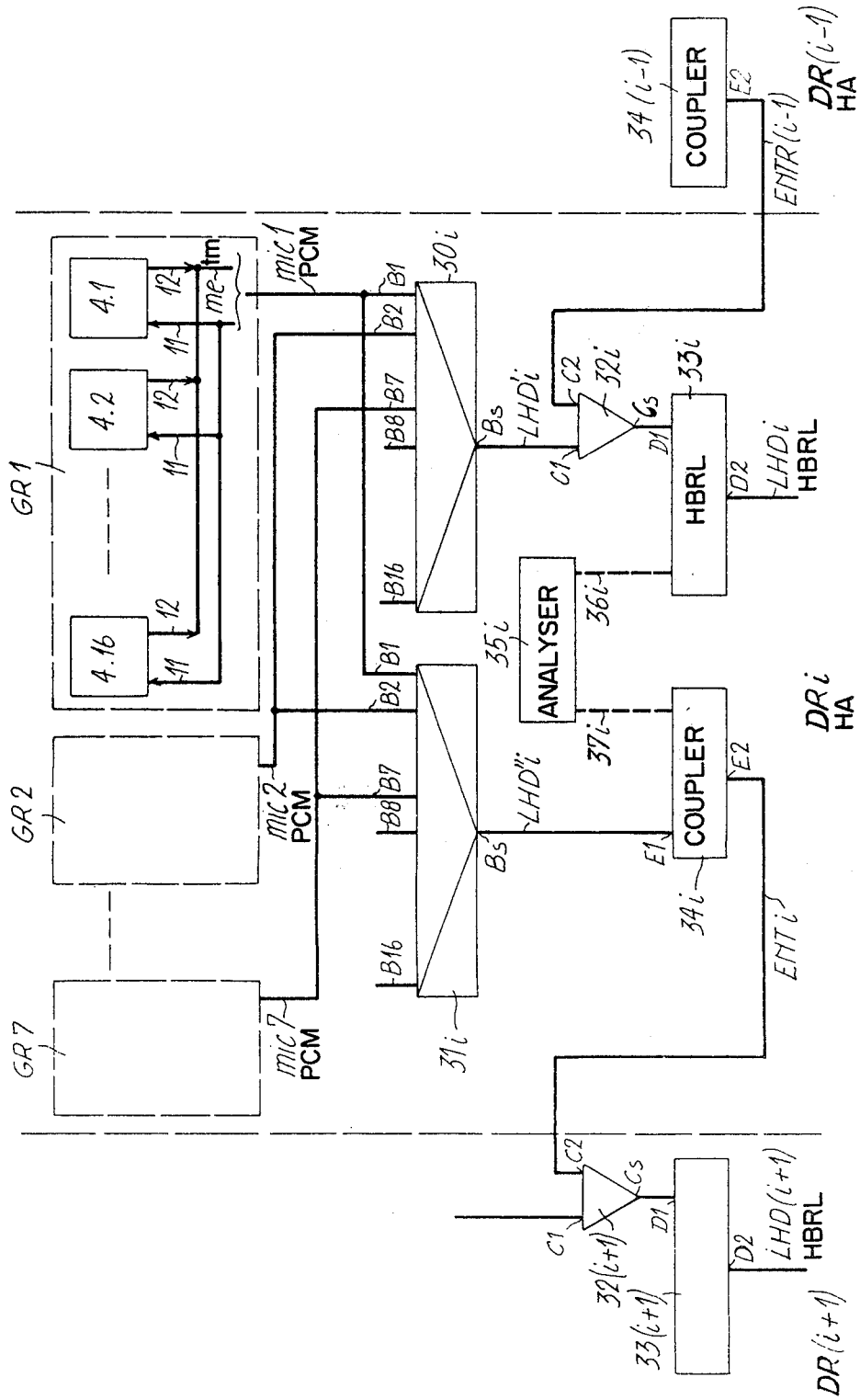
Figure 6:
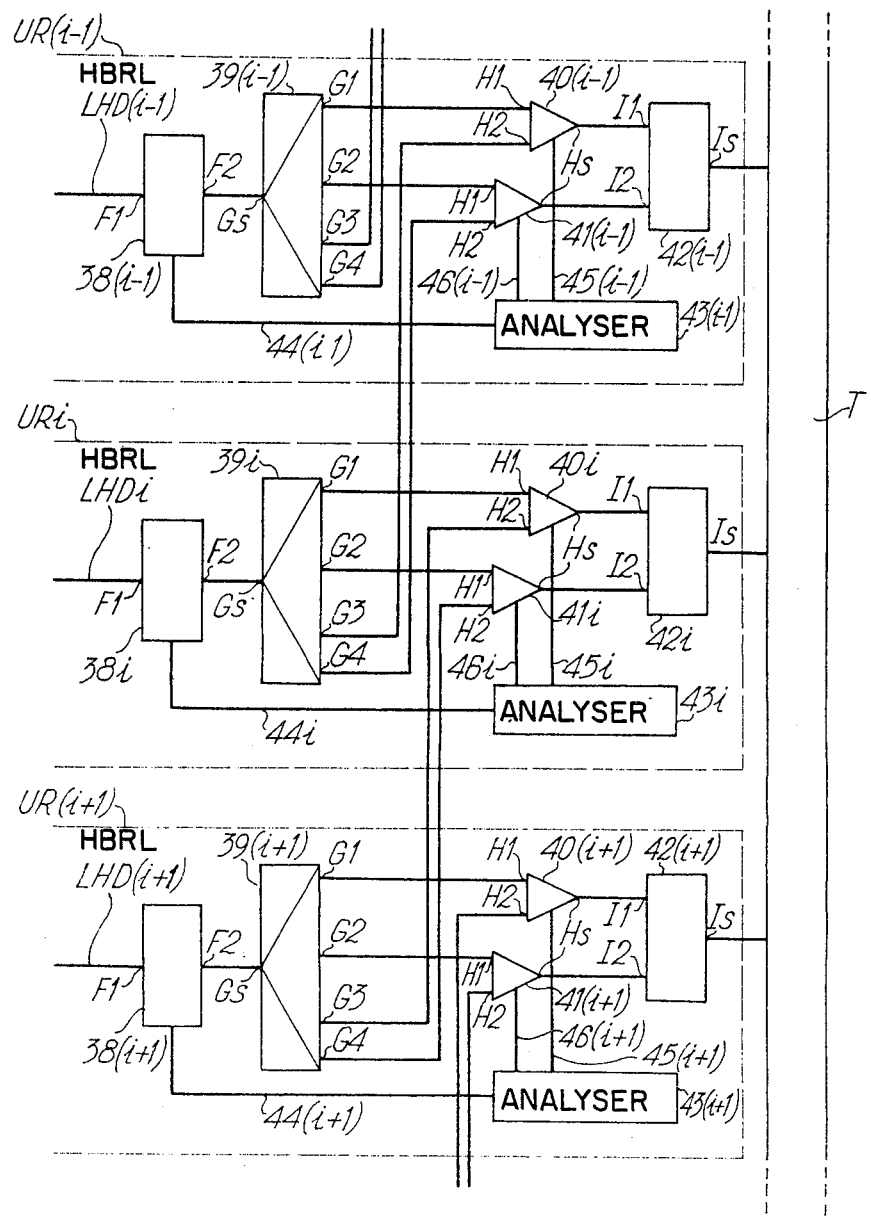
Figure 7:
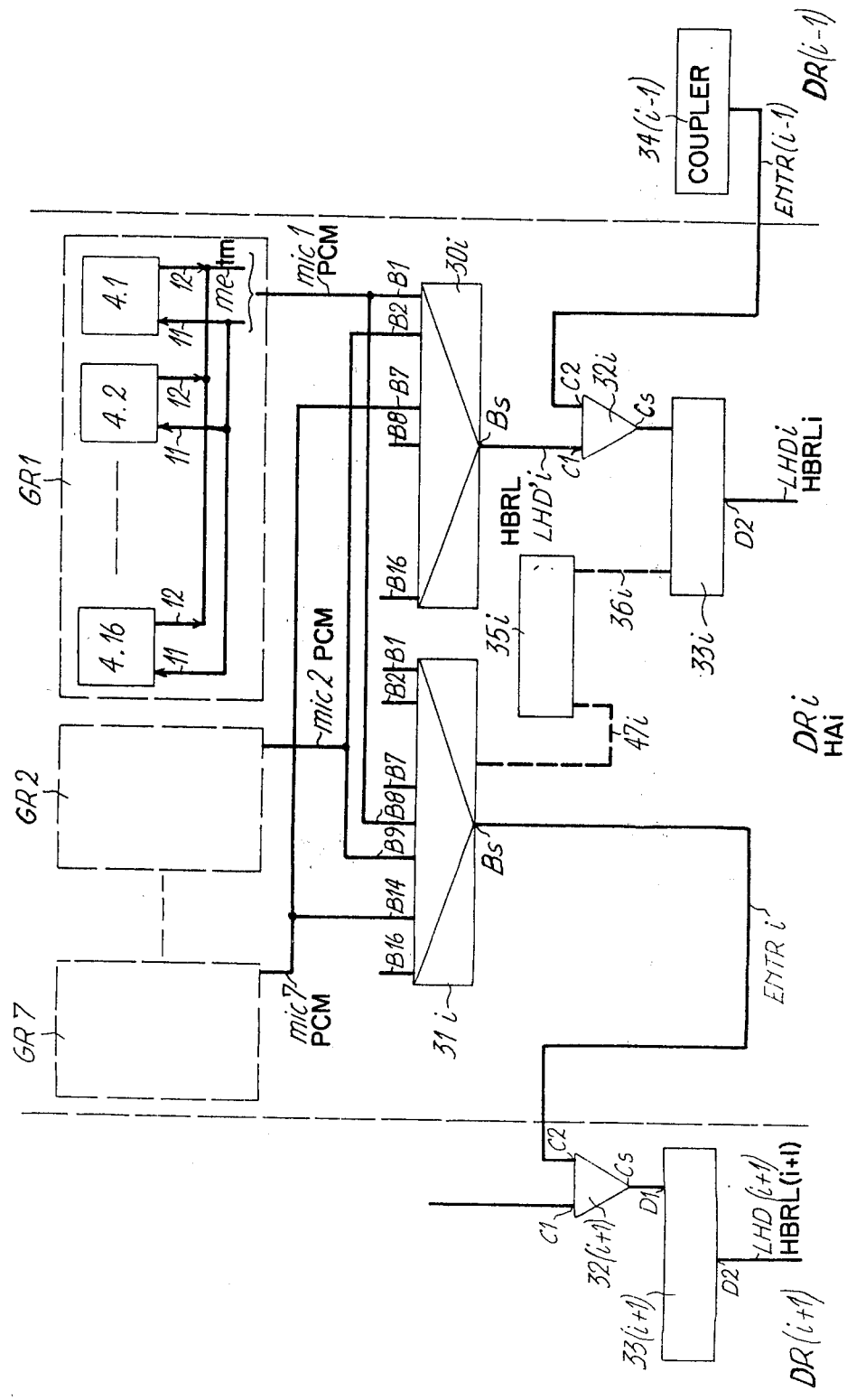

The characteristics of the above-mentioned invention, as well as others, will appear more clearly upon reading. The following description of an embodiment the said description being done in relation to the attached figures, among which:

FIG. 1 is a schematic view of a hook-up system, in accordance with the invention, connected, on one hand, to subscriber lines, and on the other hand, to a T stage of a time division switching network, FIG. 2 is a schematic block diagram of the interconnection circuits on a subscriber line, FIG. 3 is a block diagram of the individual subscriber equipment shown in FIG. 2, FIG. 4 is a block diagram of the interconnection apparatus shown in FIG. 1, FIG. 5 is a schematic illustrating the ordering of the support links, FIG. 6 is a block diagram of the interconnection unit shown in FIG. 1, and FIG. 7 is a block diagram of a variation of the hook-up apparatus of FIG. 4.

The interconnection system of FIG. 1 essentially comprises an interconnection apparatus HA, which is, on one hand, connected to cables 2 of the telephone subscriber distribution network and, on the other hand, connected by a high bit rate PCM link, to interconnection units HU which are themselves connected to switching stage T of an automatic time division switch.

On the interconnection apparatus HA we have, protection modules 3 for each physical subscriber line, each having a lightning arrestor, modules 4 called "individual subscriber equipments" also for each subscriber line. An HBR link is, on one hand, connected to an interconnection apparatus HA and, on the other hand, to an interconnection unit HU at the input of stage T in the automatic switch.

As shown in the schematic of FIG. 2, a telephone subscriber station 8 is connected, by one pair 9 of a cable 2, a protection module 3 and two wires 10, to the analog input of a subscriber equipment 4 of which one digital input 11 is connected to a PCM reception multiplex and of which one digital output 12 is connected to a PCM transmission multiplex. Cable 2 may, for example, contain 112 pairs.

The individual subscriber equipment of FIG. 3 comprises a junctor 13 connected, on one hand, to wires 10 and, on the other hand, to the two-wire input-output of a conventional shunter or differential coupler 14. Output 15 of shunter 14 is connected to the input of a low-pass filter 16. The output of filter 16 is connected to the input of a sample-and-hold 17 whose output is connected to the input of a coder 18 whose output is connected to an output register 19. Input 20 shunter 14 is connected to the output of a low-pass filter 21 whose input is connected to the output of a decoder 23 whose input is connected to the output of a register 24. In practice, the sample-and-hold 17-22, the coder 18, the decoder 23 and the registers 19 and 24 are conventional circuits set up in integrated circuit packaging which may, for example, be found commercially under the heading "Single Channel PCM CODEC" presently manufactured by American companies.

In the conventional case of sampling at 8 KHz, the transmission channel filter 16 is a second order analog filter while filter 21 is a sixth order analog filter.

The output of register 19 is connected to the digital output 12 which is connected to a PCM transmission multiplex tm while the input of register 24 is connected to the digital input 11 which is connected to a PCM reception multiplex rm, the multiplexes tm and rm thus forming what is known as a PCM link. Of course, the set of circuits 17, 18, 19, 22, 23 and 24 receive by a link referenced as 25, 8 KHz time base signals to allow, on one hand, the insertion of the coded sample in the tm and, on the other hand, the selection of the received sample from the rm multiplex.

The individual subscriber equipment of FIG. 3 is comprised also of a capture circuit 26 for the signal detected in the junctor 13 coming from subscriber line 9 and a control circuit 27 provided to activate the relays of junctor 13 according to the dialing signals received from the rm multiplex. The capture circuit 26 is connected to the input of a register 28 which also receives the time base 25 and which is connected to output 12 to allow the insertion of signalling in the time channel reserved for this purpose in the tm multiplex. The control circuit 27 is connected to the output of a register 29 which receives the time base 25 and which is connected to input 11 to receive the signalling transmitted towards the equipment concerned in the time channel reserved for this purpose in the rm multiplex.

The signalling transmitted by 26 is concerned with the state of the subscriber loop or the result of requests for service while circuit 27 allows the control of apparatus in junctor 13 such as the ringing relay, the return relay on requests for service, or, in the toll case, the third wire relay or the battery inversion relay, if the individual subscriber equipment is complemented with the corresponding modules.

We have shown in FIG. 4, how the individual equipments 4.1, 4.2, ..., 4.16 of a GR1 group of 16 individual equipments are connected by their respective inputs and outputs 11-12 by a bidirectional PCM1 multiplex link to the first terminal B1 of a multiplexor 30$i$. In the PCM1 link, we have in other respects attributed two time channels per subscriber, one channel to carry voice and the other channel for signalling.

Multiplexer 30$i$ has sixteen terminals B1 to B16, each of which can be connected to a PCM link at 2 Mbit/s and a terminals Bs connected to a two-directional HBRL'i multiplex at 34 Mbit/s. The purpose of multiplexor 30$i$ is, on one hand, to multiplex the outgoing channels of the PCM and, on the other hand, to demultiplex the return channels. Terminals B1 to B7 of multiplexor 30$i$ are effectively connected to seven multiplex PCM1 to PCM7 each serving seven groups of sixteen individual equipments GR1 to GR7. Terminals B8 to B16 are not used. Multiplexor 30$i$ is doubled by an identical multiplexor 31$i$ whose seven terminals B1 to B7 are also connected to links PCM1 to PCM7 whose terminals B8 to B16 are not utilized.

The HBRL'i is connected to a terminal C1 of a multiplexor 32$i$. The multiplexor 32$i$ has another terminal C2 and a terminal Cs which is connected to a terminal D1 of a transmitter-receiver apparatus 33$i$ whose other terminal D2 is connected to a high bit rate link HBRLi at 34 Mbit/s. Multiplexor 32$i$ is provided to multiplex the outgoing channels applied to its C1 and C2 terminals to make up the outgoing channels to terminal Cs, on one hand, and demultiplex the return channels applied to terminal Cs towards its C1 and C2 terminals. Equipment 33$i$ transcodes the 34 Mbit/s multiplex connected to its D1 terminal into a 34 Mbit/s multiplex at its D2 terminal. Such equipment is conventional.

The Bs terminal of multiplexor 31$i$ is connected, by a high bit rate link HBRL"i, to terminal E1 of coupler 34$i$, which has another terminal E2. Coupler 34$i$ serves the purpose of generating a time delay between the channels arriving at terminal E1 such that at the input of 33($i$+1), they can be placed side by side with those covering from 32($i$+1).

It is apparent that, on the HBRL'i link, between 30i and 32i, only 7×2 Mbit/s of a maximum capacity of 16×2 Mbit/s are utilized. The HBRLi and its associated circuits 30i, 31i, 32i, 33i and 34i make up a 112 line interconnection apparatus HAi. In practice, in an automatic switch there exists a number of hook-up apparatus DR1, DR2, ..., DRi, ..., DRn, such as shown in FIG. 5.

According to the invention, terminal E2 of coupler 34(i−1) is connected to the second terminal C2 of multiplexor 32i by a link ENTR(i−1). Similarly, terminal E2 of coupler 34i is connected to terminal C2 of multiplexor 32(i+1) by link ENTRi.

The interconnection apparatus HAi is furthermore completed by an analysis circuit 35i one input of which is connected by a supervisory link 36i to equipment 33i and of which one output is connected by a validation link 37i to coupler 34i. The transmitter-receiver apparatus 33i has conventional circuits capable of detecting a failure in the high bit rate link HBRLi, this failure may be the absence of the clock, an excessive error rate, a loss of locking, etc. When such a failure is detected, some information is transmitted to the analysis circuit 35i by 36i. In terms of the information received, circuit 35i triggers the operation of coupler 34i, by 37i, while gear 33i interrupts the HBRLi link. The start up of coupler 34i, normally at rest, results in transmission of the traffic of the individual equipments of HA by way of 31i, 34i and ENTRi, to multiplexor 32(i+1).

On the side of the automatic time division switch, the high bit rate links HBRL(i−1), HBRLi, HBRL(i+1), . . . are respectively connected to terminals F1 of transmission-reception apparatus . . . 38(i−1), 38i, 38(i+1), . . . . As shown in FIG. 6, F2 terminals of apparatus 38(i−1), 38i, and 38(i+1) are respectively connected to the Gs terminals of identical multiplexors 39(i−1), 39i, 39(i+1). Multiplexor 39i has four other terminals G1 to G4. Multiplexor 39i is provided to convert the 34 Mbit/s multiplex of HBRLi into four 8 Mbit/s multiplex on terminals G1 to G4 and vice versa.

Terminals G1 and G2 are respectively connected to terminals H1 of the two identical multiplexors 40i and 41i. The multiplexors 40i and 41i each also have a terminal H2 and a terminal Hs. Each of these transmits toward terminal Hs either the multiplex applied to its H1 terminal, or the multiplex applied to its H2 terminal and vice versa. The Hs terminals of 40i and 41i are respectively connected to terminals I1 and I2 of a buffer memory 42i of which one Is terminal is connected to the first T stage of the automatic switch.

We find, associated with multiplexors 39(i−1) and 39(i+1), the circuits corresponding to those associated with 39i. The H2 terminals of multiplexors 40i and 41i are respectively connected to terminals G3 and G4 of multiplexor 39(i+1) while terminals G3 and G4 of multiplexer 39i are connected to the H2 terminals of multiplexors 40(i−1) and 41(i−1).

The hook-up unit HUi, which is comprised of circuits 38i to 42i is completed by an analysis circuit 43i of which one input is connected by a supervisory link 44i to apparatus 38i and of which the outputs are respectively connected by links 45i and 46i to the control inputs of multiplexors 40i and 41i. Apparatus 38i has conventional circuits capable of detecting a failure in the high bit rate link HBRLi. If such a failure is detected, some information is transmitted to analysis circuit 43i. In terms of the information received, circuit 43i controls the multiplexors 40i and 41i such that they connect their H2 terminals, instead of the H1 terminals, to their Hs terminals. Thus, the traffic normally transmitted by 38i, 39i, 40i, 41i and 42i is now transmitted by 38(i+1), 39(i+1), 40i, 41i and 42i. Of course, the flipping of the excess traffic on link HBRL(i+1) must also be done simultaneously in interconnection apparatus HAi. It is possible that a prior agreement on the flipping of traffic from HBRLi to HBRL(i+1) be necessary. This agreement can be transmitted on a signalling channel terminated on the interconnection apparatus HA side of analysis circuit 35i. Note that the analysis circuit of the hook-up units HUi can be made up by a logic module, while the hook-up apparatuses HAi will not have any processors, the analysis circuit 35i will be a wired circuit.

We note that, in the system according to the invention, the eventual degraded case of the HBRLi links is practically unnoticeable at the level of the buffer memories and thus of the first T stages of the automatic switch. It is thus not useful to duplicate the buffer memories and their management remains simple.

The block diagram of FIG. 7 represents a variation of the hook-up apparatus of FIG. 4. In this variation, PCMs 1 to 7 are connected to terminals B8 to B14, instead of terminals B1 to B7, of 31i. In other respects, coupler 34i is suppressed, the ENTRi link being stretched to 31i. Finally, the control link 47i replaces link 37i in order to allow the control of the operation of 31i by 35i. In this variation, it is apparent that the time delay initially provided in coupler 34i is directly carried out in multiplexor 31i.

The embodiment, which has just been described corresponds to an adaptation of the particular case described in French patent No. 78 35483. In fact, according to the invention, the security system can be adapted to other systems of similar type. In fact, if we consider a set of apparatus which collects the traffic transmitted by n sources to transmit them, after transformation such as information coding, multiplexing, concentration, etc. on a high bit rate support, the failure of a high bit rate link interrupting the traffic of the apparatus which it serves and if we consider the installation at the same location of a fixed number of apparatus, it is apparent that as the number of apparatus increases, the n-fold multiplication (duplication or triplication) of the high bit rate supports becomes increasingly heavy. However, if we use a system with mutual assistance among the over-dimensioned high bit rate supports described, the above embodiment becomes increasingly interesting.

In fact, we must take into consideration the fact that what is expensive, both in terms of investment and exploitation cost is the number of high bit rate supports and not the bit rate that they carry. In the particular case described, the level of multiplexing required to install a made to measure non-normalized 14 Mbit/s link is the same as that of a normalized 34 Mbit/s link. However, the duplication of a 14 Mbit/s link would undoubtedly be costly.

I claim:

1. A system provided for the interconnection telephone subscriber lines to an automatic telephone time division switch having, on the subscriber side, interconnection apparatus and, on the automatic switch side, interconnection units, which are connected in pairs to high bit rate links, each interconnection apparatus being associated with the 112 lines of a cable and having for each single subscriber line, an individual subscriber equipment which is comprised of means to fulfill the conventional line interface functions and in addition, a conventional 2-wire/4-wire differential coupler whose 4-wire output is connected to an analog-digital and digital-analog converter whose digital output is connected to an outgoing multiplex and whose digital input is connected to an entering multiplex, together forming a PCM multiplex, each individual subscriber equipment respectively having in the said PCM multiplex an allocated outgoing channel and an allocated return channel, a PCM multiplex thus serving sixteen individual subscriber equipments, in which seven PCM are provided to serve the 112 lines of a cable, characterized in that the high bit rate links have a capacity at least double that of the hook-up apparatus HAi and in that the hook-up apparatus HAi is comprised of a first multiplexor (30$i$) and a second multiplexor (31$i$) to which are connected, on one side, the seven PCM, and a first high bit rate link (HBRL'i or HBRL''i), on the other side, a third multiplexor (32$i$) to which is connected, on one side, the first high bit rate link HBRL'i of the first multiplexor (30$i$) and a second high bit rate link (ENTR(i−1)) provided from the neighboring interconnection apparatus HA-(i−1) of immediate lower order, and, on the other side a third high bit rate link (cs−D1) which is connected to one terminal of a transmitter-receiver apparatus (33$i$) whose other terminal is connected to a high bit rate link (HBRLi), a coupler (34$i$) of which one terminal is connected to the high bit rate link (HBRL''i) of the second multiplexor and the other terminal by a second high bit rate link (ENTi) to a third multiplexor (32($i$+1)) of the neighboring hook-up apparatus (HA(i+1)) of immediate higher rank.

2. A system according to claim 1, characterized in that the interconnection unit (HUi) is comprised for connecting each high bit rate link (HBRLi) a transmitter-receiver apparatus (38$i$), a multiplexor (39$i$) connected, on one side to the transmitter-receiver apparatus and, on the other side to two equal groups of sub-multiple rate multiplexes, a second multiplexor (40$i$) connected, on one side, on one hand to the first group of sub-multiple rate multiplexes connected to the first multiplexor (39$i$) of interconnection unit (HUi) and on the other hand to the second group of sub-multiple rate multiplexes connected to the first multiplexor (39($i$+1)) of the hook-up unit (HU(i+1)) of immediate higher rank, and, on the other side, to a buffer memory (42$i$) itself being connected to the automatic time division switch (T).

* * * * *